United States Patent
Ganev et al.

(10) Patent No.: US 7,535,684 B2
(45) Date of Patent: May 19, 2009

(54) OVERSPEED PROTECTION FOR SENSORLESS ELECTRIC DRIVES

(75) Inventors: Evgeni Ganev, Torrance, CA (US); Edward L. Johnson, Torrance, CA (US); Cuong V. Nguyen, Redondo Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 313 days.

(21) Appl. No.: 11/621,478

(22) Filed: Jan. 9, 2007

(65) Prior Publication Data

US 2008/0165456 A1 Jul. 10, 2008

(51) Int. Cl.
*H02H 7/08* (2006.01)

(52) U.S. Cl. ............... 361/23; 361/5; 318/461; 318/462; 318/463; 318/465; 322/30

(58) Field of Classification Search ............... 361/23, 361/5; 322/30; 318/461, 462, 463, 465, 318/700
See application file for complete search history.

(56) References Cited

U.S. PATENT DOCUMENTS

| | | | | |
|---|---|---|---|---|
| 3,643,437 A | * | 2/1972 | Birnbaum et al. | 60/646 |
| 3,709,626 A | * | 1/1973 | Eggenberger | 415/17 |
| 3,935,677 A | * | 2/1976 | Swiatlowski | 451/294 |
| 3,975,902 A | * | 8/1976 | Smith et al. | 60/39.25 |
| 4,195,231 A | * | 3/1980 | Reed et al. | 290/40 R |
| RE30,589 E | * | 4/1981 | Park | 60/652 |
| 4,302,711 A | * | 11/1981 | Morser et al. | 318/257 |
| 4,455,522 A | * | 6/1984 | Lipo | 318/809 |
| 5,030,898 A | * | 7/1991 | Hokanson et al. | 318/146 |
| 5,180,923 A | * | 1/1993 | Tyler | 290/40 C |
| 5,301,499 A | * | 4/1994 | Kure-Jensen et al. | 60/773 |
| RE36,454 E | * | 12/1999 | Ball et al. | 322/23 |
| 6,081,093 A | | 6/2000 | Oguro et al. | |
| 6,628,099 B2 | | 9/2003 | Iwaji et al. | |
| 7,076,340 B1 | | 7/2006 | Inazumi et al. | |
| 2006/0108967 A1 | | 5/2006 | Tanaka et al. | |

FOREIGN PATENT DOCUMENTS

| | | |
|---|---|---|
| DE | 19530385 | 2/1997 |
| FR | 2845537 | 4/2004 |
| JP | 1268477 | 10/1989 |
| JP | 2006042482 | 2/2006 |

\* cited by examiner

*Primary Examiner*—Rita Leykin
(74) *Attorney, Agent, or Firm*—Oral Caglar, Esq

(57) ABSTRACT

Overspeed protection of sensorless electric drives is needed in the aerospace industry. Methods for overspeed protection may include software implementations, hardware implementations or combinations thereof. Typical high-speed rotating machinery is designed to sustain overspeed operation of up to 50% beyond maximum normal operation. This requirement leads to substantial penalties in weight and volume. The methods of the present invention may allow for an opportunity to reduce this overspeed design to about 5 to 15%, typically about 7%.

20 Claims, 4 Drawing Sheets

OVERSPEED PROTECTION FOR SENSORLESS ELECTRIC DRIVES

BACKGROUND OF THE INVENTION

The present invention generally relates to overspeed protection of sensorless electric drives and, more particularly, to apparatus and methods using software and hardware to achieve overspeed protection of sensorless electric drives.

The power electronics for aerospace applications play a significant role in the modern aircraft and spacecraft industry. This is particularly true in the area of more electric architecture (MEA) for aircraft and military ground vehicles.

The commercial aircraft industry is moving towards non-bleed air environmental control systems (ECS), variable-frequency (VF) power distribution systems, and electrical actuation. Typical examples are the latest designs, such as the Boeing 787 and the Airbus super jumbo A380. The next-generation Boeing airplane (replacement of 737) and the Airbus airplane (replacement for the A320) will most likely use MEA.

Some military aircraft already utilize MEA, including primary and secondary flight control. Military ground vehicles have migrated toward hybrid electric technology where the main power generation and propulsion employs electric machinery and associated power electronics. Therefore, substantial demand for high-performance electric drives has arisen.

High speed rotating machinery for aerospace applications is the core hardware for achieving high performance power generation and environmental control. The overspeed protection of this machinery is a very important feature to assure a fail safe operation. The pneumatic and hydraulic drives are typically designed to sustain overspeed operation of up to 50% exceeding the maximum normal operation. This requirement leads to substantial penalty in weight and volume. With implementing high speed electric drives there is a prospect of reducing this overspeed design requirements down to 7%. This opportunuity results from the ability of the modern electric drives to control the speed precisely. The accurate speed control is based on closed loop algorithms using shaft position sensors for speed measurement. However, there is a tendency to eliminate the shaft position sensors for increased reliability and reduced cost. Therefore, the real speed measurement in the most advanced sensorless control schemes does not exist.

Electric drives based on synchronous permanent-magnet machines may provide the best performance for high-speed aerospace applications. The torque in the synchronous machine may be produced by applying three-phase sinusoidal currents that create the stator flux. This stator flux may interact with the rotor flux created by a permanent magnet in such a way that they are locked to each other. Therefore, the rotating speed of the rotor may be synchronized with the excitation current of the stator. Based on this fundamental principal of operation, it is believed that as long as the excitation current of the machine controller does not exceed the maximum allowable mechanical frequency, the real speed of the drive will be within the required limit. This may be true during steady-state operation. However, there are some transient conditions in which the speed may experience overshoot above desired levels.

As can be seen, there is a need for improved apparatus and methods for overspeed protection for sensorless electric drives having improved performance and reduced cost. Such an overspeed protection methods should also result in reduced weight and volume.

SUMMARY OF THE INVENTION

In one aspect of the present invention, a method for protecting an electric drive from an overspeed condition comprises limiting an external speed command for the electric drive to 100% speed; dropping a current command in response to a rise in a speed feedback due to a decrease in motor load; limiting a maximum frequency applied to a stator of the electric drive; and measuring a frequency of phase currents from the electric drive.

In another aspect of the present invention, a system for protecting an electric drive from an overspeed condition comprises a signal conditioning circuit to convert an analog motor current feedback signal to a logic level signal representing a speed of the electric drive; an oscillator to generate a real-time clock reference; and programmable logic device to compare a motor frequency signal with a predetermined overspeed frequency limit.

In yet another aspect of the present invention, a computer readable media for protecting an electric drive from an overspeed condition comprises a code segment for limiting an external speed command for the electric drive to 100% speed; a code segment for dropping a current command in response to a rise in a speed feedback due to a decrease in motor load; a code segment for limiting a maximum frequency applied to a stator of the electric drive; a code segment for measuring a frequency of three phase currents from the electric drive; and a code segment for checking the speed feedback against a speed feedback limit.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Briefly, the present invention provides apparatus and methods for overspeed protection of high-speed rotating machinery which, for aerospace applications, is a very important feature to ensure fail-safe operation thereof. Typical high-speed rotating machinery is designed to sustain overspeed operation of up to 50% beyond maximum normal operation. This requirement leads to substantial penalties in weight and volume. The present invention may allow for an opportunity to reduce the necessity to sustain overspeed operations to about 5 to 15%, typically about 7% beyond maximum normal operation. The present invention may provide different approaches or combinations of approaches as described herein. For most of the cases, overspeed protection may be realized by the software based control algorithm. In some applications, when additional assurance is required, redundant hardware overspeed protection can be implemented. Overspeed measurement may be obtained by sensing the synchronous machine currents and then comparing them with an independent frequency source in the hardware. For systems where accelerating torque may occur from the load, a two-quadrant controller operation may be required, as described in more detail below, where the system may regenerate power to maintain the speed below required levels. Different options for regenerated power removal can be implemented depending on the amount of power and supply bus requirements.

Figure 1:
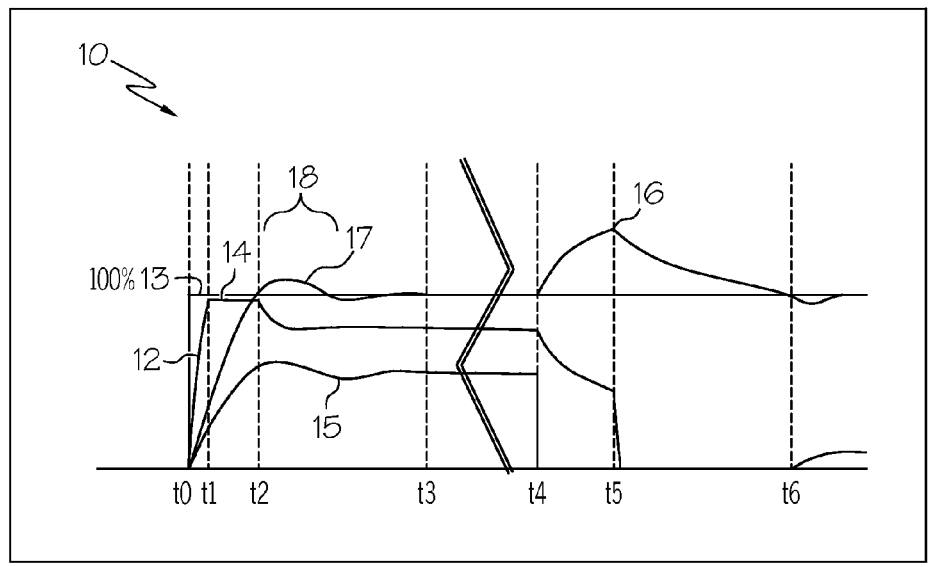
FIG. 1 is a graph showing speed transient response that may be controlled by the present invention.

Referring to FIG. 1, there is shown a graph 10 describing the speed transient response that may be controlled by the present invention. At time t0, a command for 100% speed may be requested curve 13. A motor controller speed regulator may ramp up a current output 12. At time t1, the current output 12 reaches a current limit 14. The motor controller current output 12 may be limited while a motor accelerates.

At time t2 when the motor actual speed 17 reaches a commanded speed 13, the current output 12 may come off the current limit 14 and regulate the speed following the commanded speed 13. The commanded speed 13 may be 100% speed for which overspeed protection may be important. During an overspeed period 18, a transient overspeed condition may be experienced.

The system may operate in a steady-state condition with maximum load 15 and speed from t3 to t4. The worst-case condition from over-speed perspective may occur following time t4 when the load 15 drops to zero instantly. The speed regulator ramps back the current output 12 while the motor speed may continue to increase due to the declining but not yet zero current output.

At time t5, at a predetermined recoverable overspeed set point 16, using nonlinear control logic, the conventional speed proportional integration (PI) loop may be bypassed and the current output 12 may be dropped quickly.

At time t6, as the speed reduces to the commanded speed, the controller may regulate the motor speed normally.

An overspeed condition can be expected when the load creates assisting rather than loading torque to the machine shaft. This may occur due to a mechanical failure in the environmental control system, for example. When the net torque changes from negative to positive, the drive may accelerate uncontrollably.

Another overspeed condition may occur due to hardware or software failure such that higher frequency synchronous currents may be created. A contributor to this incident could be lack of real speed measurement in the sensorless control schemes.

Figure 2:
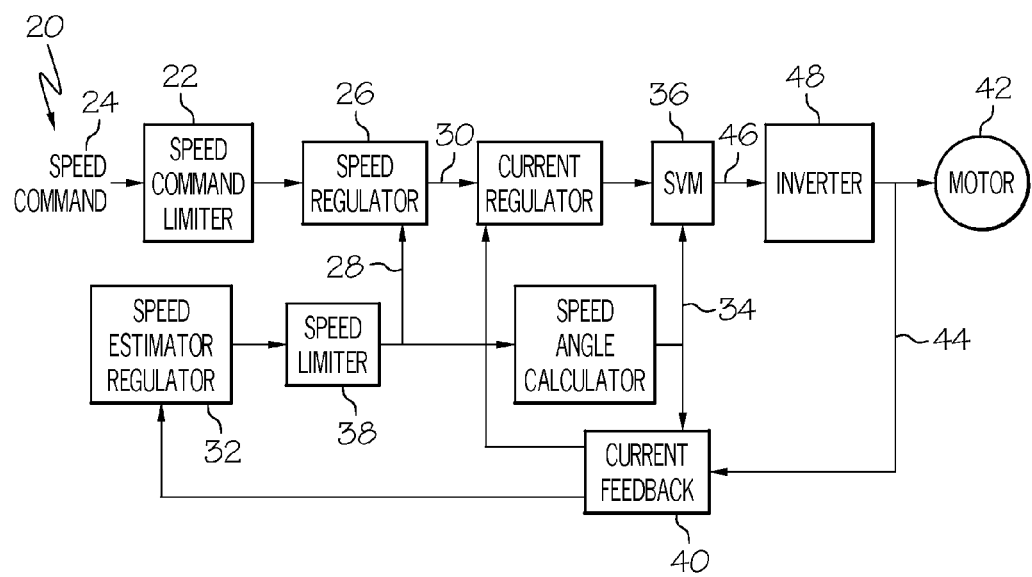
FIG. 2 is a schematic diagram showing a software implementation for overspeed protection according to an embodiment of the present invention.

Referring to FIG. 2, there is a schematic diagram of a system 20 for overspeed protection according to an embodiment of the present invention. A speed command limiter 22 may internally limit external speed commands 24 from a system controller (not shown) so that any value erroneously exceeding 100% speed will be clamped at the 100% level. This may prevent software and/or hardware malfunctions in the system controller, which may erroneously request speeds in excess of 100% speed, from causing an overspeed condition.

A speed regulator block 26 may contain a PI regulator with a feed-forward path. If a speed feedback 28 rises sharply (e.g., due to motor load dropping quickly), a resulting current command 30 may drop quickly in response and minimize the speed overshoot. This may keep the maximum speed transient below the overspeed limit. For abnormally severe load drop-offs, the speed regulator block 26 may check speed feedback 28 against a predetermined limit and, if exceeded, the current command 30 may be driven directly to zero amps. This nonlinear effect may more quickly remove acceleration torque to stop the speed increase. If speed feedback still continues to rise, a higher predetermined limit check may trigger a fault shutdown. In the case of a fault shutdown, an inverter may be disabled and the motor drops in speed.

A speed estimator regulator 32 may create the speed feedback 28 that is integrated to generate an angle command 34 to a space vector modulation (SVM) generator 36. A speed limiter block 38 following the speed estimate regulator 32 may limit the maximum frequency that is applied to an electric machine stator (not shown). As the motor 42 is a synchronous machine, a rotor of the motor 42 will not be able to rotate any faster than a stator current frequency. The stator speed limit may be selected to be above 100% speed to allow for normal speed regulator transients and below the overspeed containment limit which may be, for example, 107% or 115%.

In a current feedback block 40, a motor current sensor feedback 44 may be used to determine speed of the motor 42 by measuring the frequency of the phase currents. If this speed exceeds the predetermined overspeed limit, a fault shutdown may occur. To help verify that current sensors (not shown) are operating correctly the three current feedbacks (from each of the three phases of the motor 42) are summed. The result should be zero and, if a threshold is exceeded, a fault shutdown may result. This test can only be performed when three instead of just two sensors are used.

The above describes normal operation of the controls. The below covers abnormal operation and how overspeed is prevented in these abnormal situations.

One source of motor overspeed may be due to the possibility that software memory locations can become corrupted. For increased protection, limit comparisons in software may be performed twice. In this way, a second constant stored in the code may be used that is not corrupted. For example, the predetermined overspeed limit stored in one part of the code may become corrupted wherein, instead of being at, for example, 115%, this portion of the code may be changed to, for example, 200%. By having the predetermined overspeed limit stored in a second portion of the code, the likelihood of both software memory locations being corrupted is less and therefore, increased overspeed protection may be achieved. The software may be programmed to use the lower of these two predetermined overspeed limits, or alternatively, may be programmed to result in a fault shutdown when the two software memory locations differ.

Another source of motor overspeed may be due to the accuracy of a crystal oscillator frequency. The accuracy of the motor speed feedback is only as precise as the crystal oscillator frequency that clocks the digital signal processor (DSP). An oscillator running at a higher-than-specified frequency will result in a motor rotating at a higher-than-expected speed. To cross-check for an error in oscillator frequency, the DSP, in conjunction with digital hardware, measures the frequency. Excessive mismatch may result in a fault shutdown.

Still another source of motor overspeed may be due to a failure condition in which the software could stop executing code. In this condition the hardware could generate pulse width modulation (PWM) signals 46 to an inverter 48 using the last PWM duty cycle values written by the DSP to the hardware and would stay in effect continuously. Essentially, the inverter frequency driving the stator would be stalled at 0 Hz. The rotor would keep rotating due to inertia and a negative rotor torque would be developed over the next 90 deg of rotor rotation. Within a few tens of degrees of rotation, the stator currents would go out of control as the back electromotive force (EMF) voltage vector rotates. This would result in a hardware-detected overcurrent fault shutdown. Eventually, a watchdog timer (not shown) would time-out and reset the software, but the overcurrent shutdown would most likely occur first.

Another potential failure condition is one in which the software still executes code but does so incorrectly. With SVM 36, correct software execution is critical for driving the motor 42. Control values are computed and changed in every real-time update frame. The controls must all operate correctly to stay synchronized to the motor and regulate currents. There is a very high probability that any software misstep may result in an overcurrent shutdown. Such a shutdown is performed purely by hardware circuitry and is not reliant on software.

The software-based system 20 described above may be encoded on a computer readable media. The computer readable media may have several code segments for carrying out the various steps in system 20. For example, the computer based media may include a code segment for limiting an external speed command for the electric drive to 100% speed; a code segment for dropping a current command in response to a rise in a speed feedback due to a decrease in motor load; a code segment for limiting a maximum frequency applied to a stator of the electric drive; and a code segment for measuring a frequency of three phase currents from the electric drive.

Figure 3:
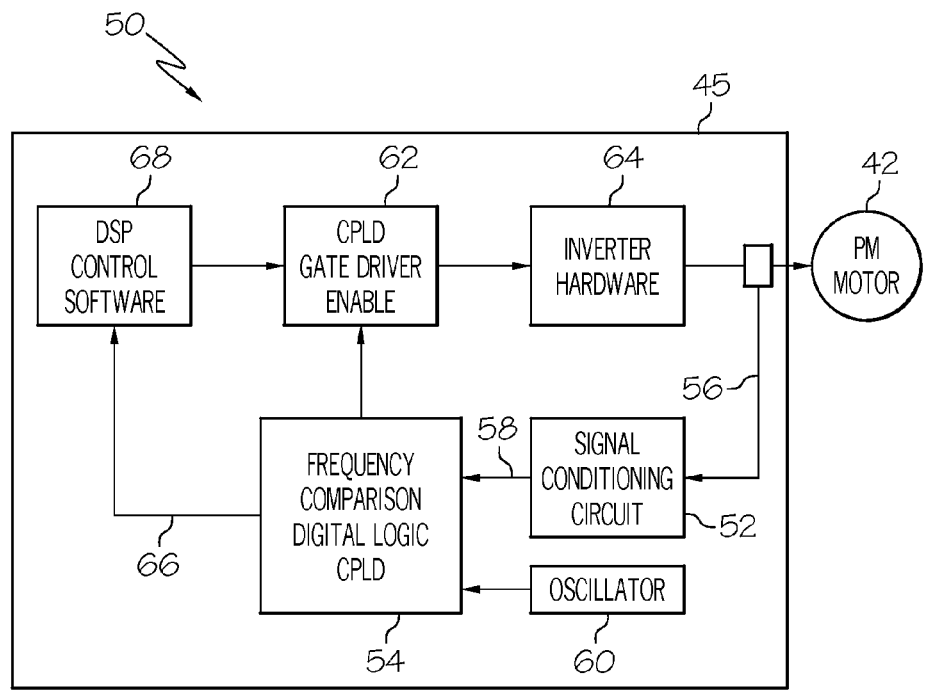
FIG. 3 is a block schematic diagram showing a hardware implementation for overspeed protection according to another embodiment of the present invention.

FIG. 3 is a block schematic diagram showing a system 50 for overspeed protection according to another embodiment of the present invention. The system 50 may be a hardware-based system, completely independent from the software-based system described above with reference to FIG. 2. Hence, regardless of the failure condition in the software, protection provided by the system 50 may save the hardware from overspeed failure. Also, the system 50 may use an independent oscillator 60 to prevent common failure between hardware and software overspeed protections.

The hardware overspeed protection may include a signal conditioning circuit 52 and a frequency comparison digital logic 54. The signal conditioning circuit 52 may convert an analog motor current feedback signal 56 to a logic level motor frequency signal 58 representing the speed of a motor 42. The frequency comparison digital logic 54 may include a complex programmable logic device (CPLD) and a dedicated oscillator 60 to generate real-time clock reference. The CPLD 54 may compare a motor frequency signal 58 with a preprogrammed overspeed frequency limit point. If a preset limit is exceeded, an overspeed shutdown fault command may be transmitted to a gate driver enable circuit 62 to disable an inverter 64.

The system 50 may utilize a conventional filtering technique to eliminate nuisance faults due to noise on the current signal. The CPLD 54 can also transmit a motor speed signal 66 to the DSP control software 68 for additional cross-checking of the frequency of the oscillator 60 with the oscillator used in conjunction with the software-based system described above with reference to FIG. 2.

In the case of an overspeed condition resulting from assisting rather than loading torque, the motor speed can be controlled by changing the mode of operation of the controller 45 so that the motor 42 may operate in generating mode. In this case, a two-quadrant controller operation may be required to make the appropriate mode change. In other words, the motor 42 may operate as a generator and the controller 45 may condition the regenerated power from the motor 42 to dc power. Hence, electrical loading of the motor 42 may prevent further acceleration and an overspeed condition.

Figure 4:
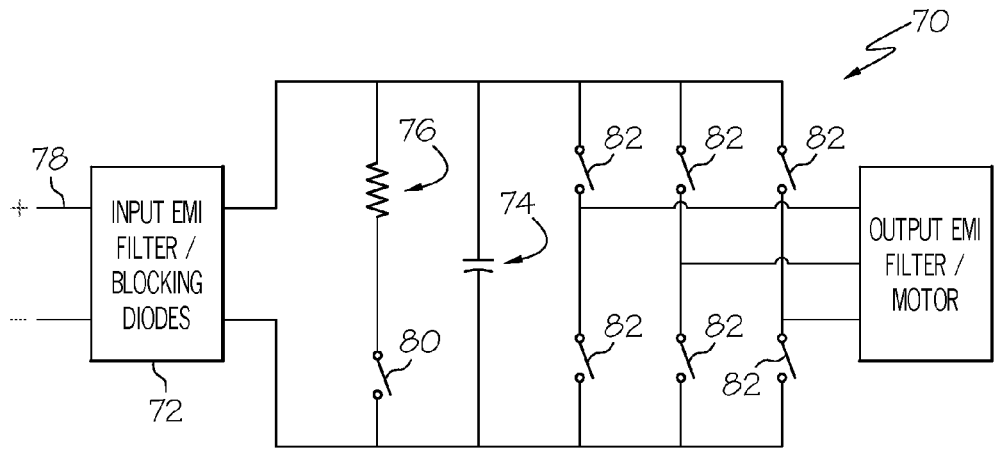
FIG. 4 is a schematic diagram showing a power topology for regenerative overspeed protection according to another embodiment of the present invention.

Referring now to FIG. 4, there is shown a schematic diagram showing a power topology or circuit 70 for regenerative overspeed protection according to another embodiment of the present invention. Depending on the amount of the regenerated power (as discussed above) and the allowance to regenerate power to a DC bus 78, at least three power circuits may be possible for regenerative overspeed protection.

The first power circuit may be used when regenerating power back to the bus 78 is not allowed depending on the supply bus requirements. In this instance, blocking diodes located in 72 may be used to prevent reverse current flow. When a minimal amount of energy is generated, the energy may be absorbed by a dc link capacitor 74 without overcharging it.

A second power circuit may be used when more energy is generated from the motor 42 than may be absorbed by the dc link capacitor 74. In this power circuit 70, the dc link voltage may be monitored and an internal power dissipater 76 may be switched on with a switch 80 to absorb the generated energy. The switch 80 may be modulated by a closed loop voltage control to regulate the dissipated power in 76. The size of the power dissipater 76 may vary based on, for example, the size of the motor 42. Blocking diodes located in 72 are typically required for this option.

In a third power circuit, blocking diodes in 72, power dissipating elements 76 and switch 80 may not be required and power may be regenerated back to the bus 78 via operating the switches 82 in a generating mode to deliver DC current to the distribution bus 78. A large amount of energy can be returned to the bus without need for additional components in the controller and no additional losses.

The above described software and hardware implementations for overspeed protection for sensorless electric drives may present several advantages, for example, a) reduced weight due to a reduced overspeed design requirements of all rotating and containment components; b) reduced volume for the same reasons; c) reduced cost due to a reduced overall weight and volume reduction from rotating and containment hardware; d) the software implementation may be relatively simple and may require minor changes in the sensorless control algorithm; and e) the hardware implementation may use already installed current sensors for overspeed detection.

Figure 5:
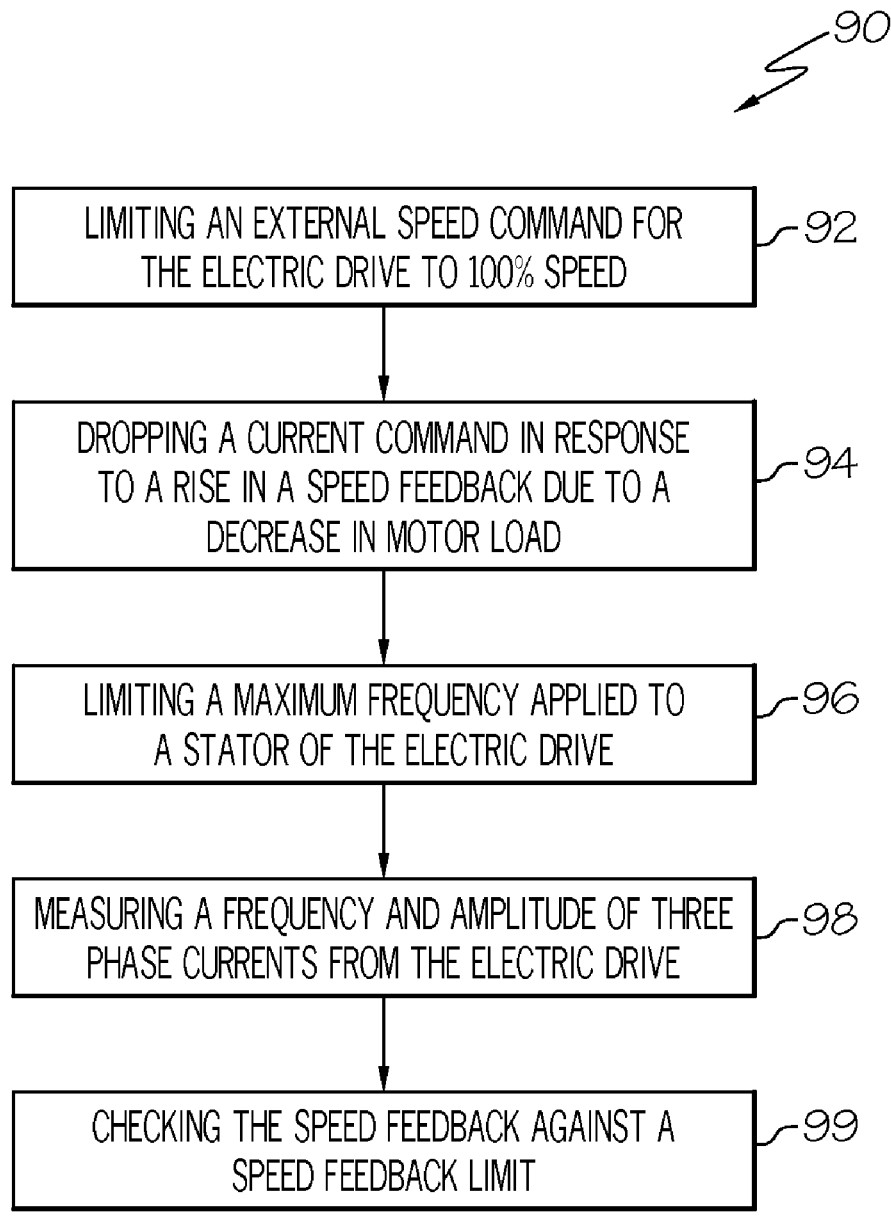
FIG. 5 is a flow chart showing a method according to the present invention.

Referring to FIG. 5, there is shown a flow chart depicting a method 90 according to the present invention. A step 92 may limit an external speed command for the electric drive to 100% speed. This step 92 may include comparing the external speed control to a first speed limit stored in a first memory location and a second speed limit stored in a second memory location, and triggering a fault shutdown of the electric drive occurs when the first speed limit differs from the second speed limit. By using two speed limits stored in different locations, the corruption of one of the speed limits may not result in the incorrect powering of the electric drive.

A step 94 may drop a current command in response to a rise in a speed feedback due to a decrease in motor load. A step 96 may limit a maximum frequency applied to a stator of the electric drive. This maximum frequency may be above the frequency needed for 100% speed, thereby allowing for normal speed regulator transients. A step 98 may measure the amplitude and frequency of three phase currents from the electric drive. A sum of these three phase currents should be zero. In the case where the sum is not zero, a fault shutdown of the electric drive may be triggered. A step 99 may check the speed feedback against a speed feedback limit and drive a current command to the electric drive to zero amps if the speed feedback exceeds the speed feedback limit.

Figure 6:
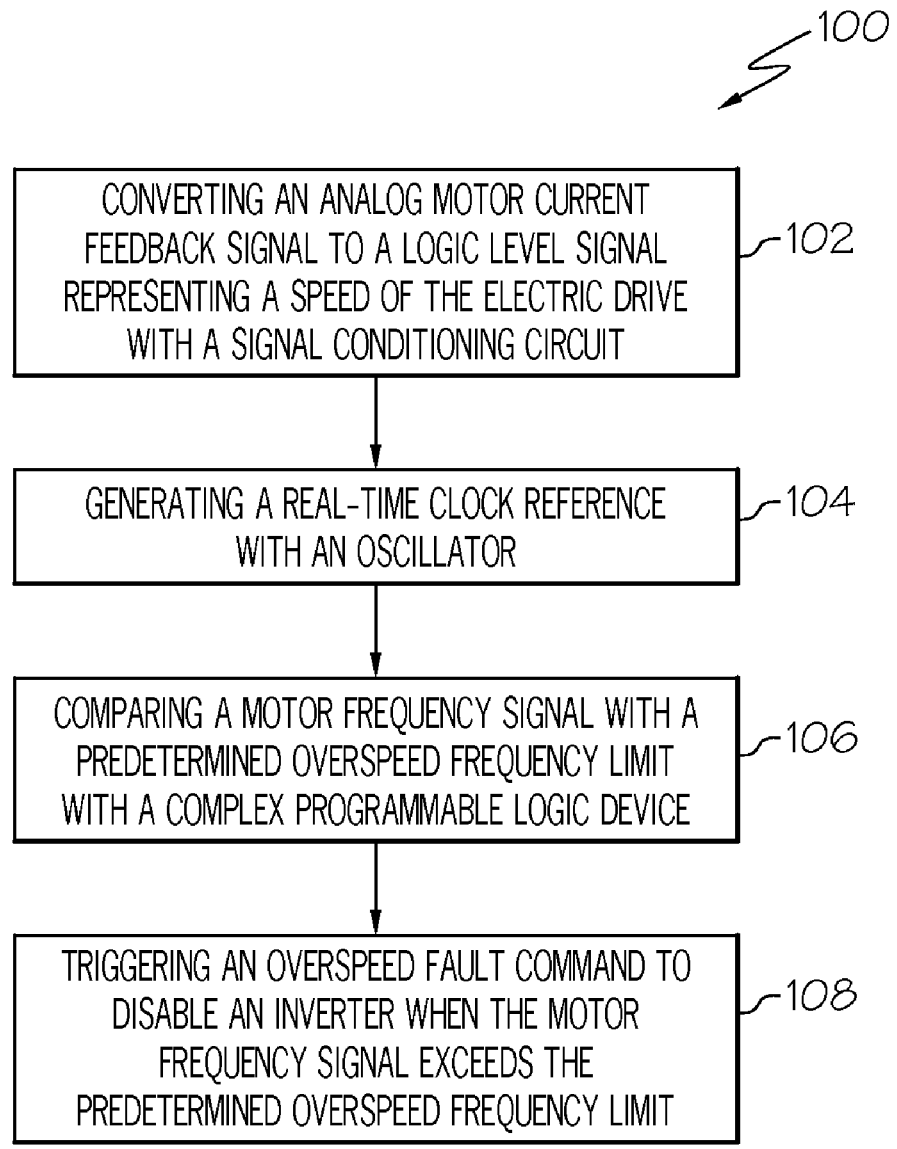
FIG. 6 is a flow chart showing another method according to the present invention.

Referring to FIG. 6, there is shown a flow chart depicting a method 100 according to the present invention. A step 102 may convert an analog motor current feedback signal to a logic level signal representing a speed of the electric drive with a signal conditioning circuit. A step 104 may generate a real-time clock reference with an oscillator. When the hardware implementation of FIG. 6 is used with the software implementation of FIG. 5, the oscillator used in the method of FIG. 6 may be a separate, dedicated oscillator. A step 106 may compare a motor frequency signal with a predetermined overspeed frequency limit with a programmable logic device. If the predetermined overspeed frequency limit is exceeded, an overspeed shutdown fault command may be transmitted to a gate driver enable circuit to disable the inverter in a step 108.

It should be understood, of course, that the foregoing relates to exemplary embodiments of the invention and that modifications may be made without departing from the spirit and scope of the invention as set forth in the following claims.

We claim:

1. A method for protecting an electric drive from an overspeed condition, the method comprising:
   limiting an external speed command for the electric drive to 100% speed;
   dropping a current command in response to a rise in a speed feedback due to a decrease in motor load;
   limiting a maximum frequency applied to a stator of the electric drive; and
   measuring a frequency and an amplitude of phase currents from the electric drive.

2. The method according to claim 1, wherein the step of limiting the external speed command for the electric drive to 100% speed further comprises comparing the external speed command with a first speed limit stored in a first memory location and a second speed limit stored in a second memory location.

3. The method according to claim 2, wherein a fault shutdown of the electric drive occurs when the first speed limit differs from the second speed limit.

4. The method according to claim 1, further comprising measuring a motor speed with a digital signal processor oscillator that clocks the digital signal processor.

5. The method according to claim 1, further comprising:
   checking the speed feedback against a speed feedback limit; and
   driving a current command to the electric drive to zero amps if the speed feedback exceeds the speed feedback limit.

6. The method according to claim 5, further comprising:
   checking the speed feedback to a second speed feedback limit; and
   triggering a fault shutdown when the speed feedback exceeds the second speed feedback limit.

7. The method according to claim 1, wherein the maximum frequency applied to the stator of the electric drive is above 100% to allow for normal speed regulator transients.

8. The method according to claim 1, further comprising:
   summing three of the phase currents from the electric drive; and
   triggering a fault shutdown when the sum of the three phase currents is not zero.

9. The method according to claim 1, further comprising:
   converting an analog motor current feedback signal to a logic level signal representing a speed of the electric drive with a signal conditioning circuit;
   generating a real-time clock reference with an oscillator; and
   comparing a motor frequency signal with a predetermined overspeed frequency limit with a programmable logic device.

10. The method according to claim 9, further comprising triggering an overspeed fault command to disable an inverter when the motor frequency signal exceeds the predetermined overspeed frequency limit.

11. The method according to claim 9, further comprising transmitting a speed signal representing the speed of the electric drive to a digital signal processor as a speed crosscheck between the oscillator and a digital signal processor oscillator that clocks the digital signal processor.

12. A system for protecting an electric drive from an overspeed condition comprising:
   a signal conditioning circuit to convert an analog motor current feedback signal to a logic level signal representing a speed of the electric drive;
   an oscillator to generate a real-time clock reference; and
   programmable logic device to compare a motor frequency signal with a predetermined overspeed frequency limit.

13. The system according to claim 12, wherein an overspeed fault command is generated when the motor frequency signal exceeds the predetermined overspeed frequency limit.

14. The system according to claim 12, wherein the electric drive is a high speed sensorless electric drive.

15. The system according to claim 12, further comprising software for further protecting the electric drive from the overspeed condition, the software limiting an external speed command for the electric drive to 100% speed; dropping a current command in response to a rise in a speed feedback due to a decrease in motor load; limiting a maximum frequency applied to a stator of the electric drive; and measuring a frequency of three phase currents from the electric drive.

16. The system according to claim 15, wherein the software drives a current command to the electric drive to zero amps if the speed feedback exceeds a first speed feedback limit and the software triggers a fault shutdown when the speed feedback exceeds the second speed feedback limit.

17. A computer readable media for protecting an electric drive from an overspeed condition comprising:
   a code segment for limiting an external speed command for the electric drive to 100% speed;
   a code segment for dropping a current command in response to a rise in a speed feedback due to a decrease in motor load;
   a code segment for limiting a maximum frequency applied to a stator of the electric drive;
   a code segment for measuring a frequency of three phase currents from the electric drive; and
   a code segment for checking the speed feedback against a speed feedback limit.

18. The computer readable media according to claim 17, further comprising:
   a code segment for driving a current command to the electric drive to zero amps if the speed feedback exceeds the speed feedback limit; and
   a code segment for triggering a fault shutdown when the speed feedback exceeds the second speed feedback limit.

19. The computer readable media according to claim 17, further comprising:
 a code segment for summing the three phase currents from the electric drive; and
 a code segment for triggering a fault shutdown when the sum of the three phase currents is not zero.

20. The computer readable media according to claim 17, further comprising a code segment to allow for normal speed regulator transients by permitting the maximum frequency applied to the stator of the electric drive to be above 100%.

* * * * *